June 26, 1951     H. F. MELOT     2,558,493

DEICER ARRANGEMENT FOR AIRPLANES

Filed March 9, 1948

Inventor
Henri Fabrice Melot
By Robert E. Burns
Attorney

Patented June 26, 1951

2,558,493

UNITED STATES PATENT OFFICE 2,558,493

DEICER ARRANGEMENT FOR AIRPLANES

Henri Fabrice Mélot, Paris, France, assignor of one-half to Societe a Responsabilite Limite Gaz et Chaleur, Paris, France, a corporation of France Application March 9, 1948, Serial No. 13,878
In France March 15, 1947

7 Claims. (Cl. 244—134)

1

The fight against ice formation on aircraft wings, tail-units, rudders and stabilizers has given rise to various pneumatic devices as well as gasoline burner heating systems, compressed air or electrical resistance systems. These different systems involve either drawbacks or hazards. Pneumatic systems which consist in lining the leading edge with a rubber strip adapted to be distorted by the pulsatory transmission of air under pressure are efficient only after a layer of ice about ⅛ in. or 3/16 in. has formed and the protection afforded is limited to a relatively shallow strip. Furthermore, such systems may not be applied to high-speed, thin-winged aircrafts.

Heating systems by which hot air is blown into the wings and other hollow surfaces necessitate the use of one or more gasoline burners with consequent great fire hazard which is in admissable on an aircraft; moreover in such systems large diameter pipes must be fitted into the wing thickness thereby making it very difficult, if not altogether impossible to fit out thin-winged ships.

The method of using an electric heating system operating by means of spaced electric resistors, involves a considerable current consumption requiring the installation of cumbersome, heavy and large power generators on the aircraft, a 20-ton aircraft requiring about 100 kw.

The present invention has for its object the provision of a de-icing apparatus, without the drawbacks, hazards or complexities of prior art systems.

The de-icer device according to the invention is characterized by the provision of catalytic heaters, remote-control fed with the selected fuel and adapted to heat the aircraft wing, tail-unit, stabilizer, and other parts to be protected against the effect of frost. Since the catalysis is rigorously flameless and without the least glowing point, and since its operation strictly eliminates over-heating, the apparatus is completely fireproof.

In addition, the starting, feeding and control during operation are all remote controlled and may be under the constant supervision of the crew engineer.

The accompanying drawing shows, by way of non-limitative example, a particular embodiment of the invention, in which.

2

Figure 3:
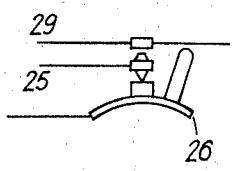
Figure 4:
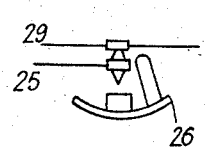

1 through one heating element, showing the electric circuit for starting and controlling the operation of the apparatus;

Figs. 3 and 4 are diagrammatical views of one control thermostat in starting and heating position, respectively.

Figure 1:
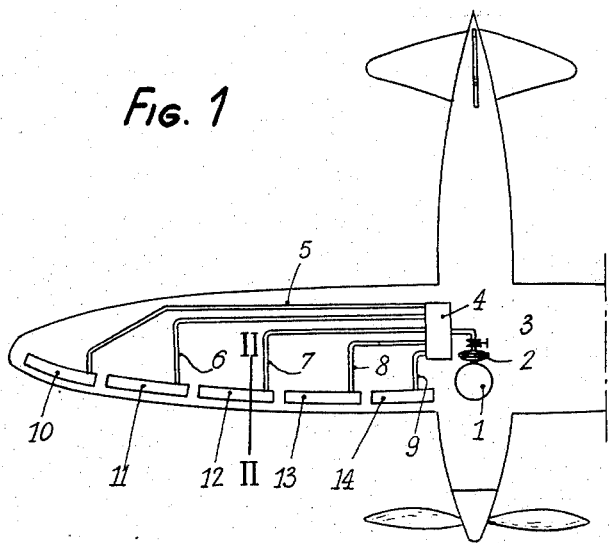
Fig. 1 is a diagrammatic plan view of an aircraft side-wing equipped with the de-icer according to the invention.

Referring now to the diagrammatic illustration of Fig. 1, a tank 1 containing liquified propane or any other liquified fuel such as butane, pure or acetylened liquid ammonia, is connected to a pressure-reducing valve 2 of the adjustable type but which is automatically compensated in relation to the altimetric variations of the surrounding pressure; a pressure gauge 3 indicates the release pressure of the gas; the released gaseous fuel passes through a manifold 4 having several connecting lines in multiples 5, 6, 7, 8 and 9 derived therefrom consisting of small diameter tubes; each line forms a derived circuit which may be provided with an output indicator of any known or suitable system such as an output-measurer, a differential pressure gauge, etc. (not shown) and ends in the corresponding catalyst elements 10, 11, 12, 13 and 14 which are disposed in longitudinally-adjacent relationship to each other.

Figure 2:
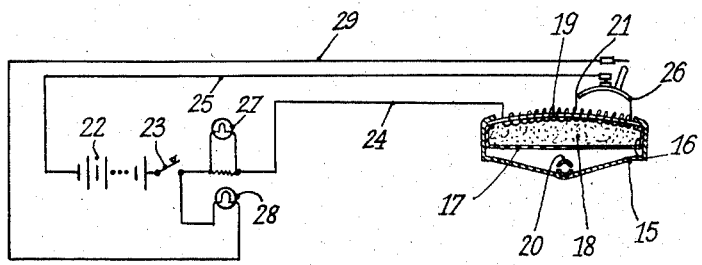
Fig. 2 is a partial section on line II—II of Fig.

Each catalyst element (Fig. 2) comprises a metal casing 15 shaped in accordance with the aircraft part in which it is to be mounted. The casing 15 is provided internally with a frame 16 having a grid 17 and a filler 18 of asbestos fibre, glass silk or similar material, topped by a catalyst supporting element 19 such as a mass, layer or sheet of asbestos cloth or fabric impregnated with any chemical substance acting as an oxidation catalyst, such as platinum salts, etc. The inner side of the bottom of the casing is provided with a distributor 20 having slits, holes or other apertures which may be replaced by any known distributing device; the distributor 20 is connected outside of the casing with the associated line 5, 6, 7, 8 or 9.

On the catalyst cloth 19, either beneath or within the latter an electric resistor wire 21 is arranged for priming the catalysis by causing a preliminary heating of the cloth 19.

The electric current from any suitable source 22 is controlled by means of a manual or automatic switch 23 according to the differential temperature of the planes to be protected and the surrounding atmosphere and is fed to the resistor 21 through connecting wires 24, 25 and a thermostat switching and controlling device 26 of any known type, such as a selector knife-switch, positioned adjacent to the catalyst element 19. The pilot-lamp 27 inserted in shunt in the circuit 24, 25 of the resistor 21 is provided for showing if the latter is operating or not (Fig. 3). Another pilot-lamp 28 connected in series in the circuit is fed through the wires 25, 29 for indicating that the catalyst is in operation as a result of the contact reversal caused by the operation of the thermostat element 26 (Fig. 4) due to a temperature increase.

The electric priming may be replaced by emitting beforehand a small amount of gas having a marked catalyzing characteristic, such as hydrogen.

The above-described apparatus may be adapted to operate with any fuel other than liquefied gases, such as gasoline or other hydrocarbons, alcohols, etc., by simply lining the bottom of the casings to form a double-wall containing an absorbent such as cotton, glass-wool, etc., according to any suitable known method.

Furthermore, it is advantageous in most cases to provide a diffuser element adapted to restrict the flow somewhat in order to build up a pressure within the casing 15. It is of advantage to have this pressure equal to or greater than the fuel load within the casing. A practical execution of this arrangement may be obtained by replacing the grid 17 (Fig. 2) with a perforated plate or by adding the latter beneath the stuffing or filler 18. The apertures in the plate will have variable dimensions and their area per square unit will be such as to cause a flow-resisting action whereby a loss of load as well as a distributing effect on the fluid engaging the filler 18 will occur. Then, the filler will act as a diffuser element thus completing the distributing action of the perforated plate.

The apparatus may be used not only for de-icing purposes but also for any kind of heating installations as for aircraft cockpits or cabins, automobiles, railway passenger carriages, ships, home or industrial heating, drying-rooms, glass-houses, artificial fruit growing or ripening, etc.

What I claim is:

1. In an airplane, de-icing arrangement comprising a plurality of catalytic heaters disposed adjacent the surface to be heated, each of said heaters including supporting means for the catalyzer, a source of fuel-gas for said heaters, and conduit means for supplying fuel gas from said source individually to each of said heaters.

2. In an airplane, de-icing arrangement comprising a plurality of catalytic heaters disposed adjacent the surface to be heated in longitudinally-adjacent relationship, each of said heaters including a casing and supporting means for the catalyzer disposed in said casing, a source of fuel-gas for said heaters, and conduit means for supplying fuel gas from said source individually to each of said heaters.

3. In an airplane, de-icing arrangement comprising a plurality of catalytic heaters disposed adjacent the surface to be heated in longitudinally-adjacent relationship, each of said heaters including a casing, a surface supporting the catalyzer closing said casing and a gas-distributing perforated plate disposed in said casing, a source of fuel-gas for said heaters, and conduit means for supplying fuel gas from said source individually to each of said heaters.

4. In an airplane, de-icing arrangement comprising a plurality of catalytic heaters disposed adjacent the surface to be heated in longitudinally-adjacent relationship, each of said heaters including a casing, a surface supporting the catalyzer closing said casing and a gas-distributing perforated plate disposed in said casing, a source of fuel-gas for said heaters, and conduit means for supplying fuel gas from said source individually to each of said heaters, the perforations in said plate being arranged to effect a flow-resisting action upon the fuel gas supplied through each of said conduit means.

5. In an airplane, de-icing arrangement comprising a plurality of catalytic heaters disposed adjacent the surface to be heated, each of said heaters including supporting means for the catalyzer, a source of fuel-gas for said heaters, conduit means for supplying fuel gas from said source individually to each of said heaters, and means for supplying said heaters with a gas of greater catalytic susceptibility than said fuel gas when operation of the heaters is initiated.

6. In an airplane, de-icing arrangement comprising a plurality of catalytic heaters disposed adjacent the surface to be heated, each of said heaters corresponding in shape to the airplane part with which it is associated and including supporting means for the catalyzer and an electrical resistance disposed in proximity to said support, a source of electrical energy, and means for connecting said electrical energy source with the resistances in the heaters for energizing said resistances when operation of the heaters is initiated.

7. In an airplane, de-icing arrangement comprising a plurality of catalytic heaters disposed adjacent the surface to be heated in longitudinally-adjacent relationship, each of said heaters corresponding in shape to the airplane part with which it is associated and including a casing, supporting means for the catalyzer, and an electrical resistance disposed in proximity to said support, a source of electrical energy, and means for connecting said electrical energy source with the resistances in the heaters for energizing said resistances when operation of the heaters is initiated.

HENRI FABRICE MÉLOT.

REFERENCES CITED

The following references are of record in the file of this patent:

UNITED STATES PATENTS

| Number | Name | Date |
|---|---|---|
| 859,259 | Smith | July 9, 1907 |
| 1,202,199 | Lumiere et al. | Oct. 24, 1916 |
| 1,347,631 | Herck | July 27, 1920 |
| 1,506,322 | O'Neill | Aug. 26, 1924 |
| 1,506,323 | O'Neill | Aug. 26, 1924 |
| 1,532,930 | O'Neill | Apr. 7, 1925 |
| 2,309,682 | Van Daam | Feb. 2, 1943 |
| 2,418,205 | Taylor | Apr. 1, 1947 |